United States Patent
Langholz et al.

(10) Patent No.: US 10,754,136 B2
(45) Date of Patent: Aug. 25, 2020

(54) CONFOCAL MICROSCOPE WITH APERTURE CORRELATION

(71) Applicant: Carl Zeiss Microscopy GmbH, Jena (DE)

(72) Inventors: Nils Langholz, Apolda (DE); Viktor Drescher, Blankenhain (DE); Helmut Lippert, Jena (DE); Wolfgang Schwerdtfeger, Weimar (DE)

(73) Assignee: Carl Zeiss Microscopy GMBH, Jena (DE)

( * ) Notice: Subject to any disclaimer, the term of this patent is extended or adjusted under 35 U.S.C. 154(b) by 0 days.

(21) Appl. No.: 15/127,101

(22) PCT Filed: Mar. 19, 2015

(86) PCT No.: PCT/EP2015/055800
§ 371 (c)(1),
(2) Date: Sep. 19, 2016

(87) PCT Pub. No.: WO2015/144557
PCT Pub. Date: Oct. 1, 2015

(65) Prior Publication Data
US 2017/0108682 A1  Apr. 20, 2017

(30) Foreign Application Priority Data

Mar. 24, 2014 (DE) .................. 10 2014 004 249

(51) Int. Cl.
*G02B 21/00* (2006.01)
*G02B 21/36* (2006.01)
(Continued)

(52) U.S. Cl.
CPC ............ *G02B 21/008* (2013.01); *G01B 11/24* (2013.01); *G02B 21/0044* (2013.01);
(Continued)

(58) Field of Classification Search
CPC .............. G02B 21/008; G02B 21/0044; G02B 21/367; G02B 21/06; G02B 21/361; G01B 11/24
(Continued)

(56) References Cited

U.S. PATENT DOCUMENTS 6,144,489 A    11/2000 Wilson et al.
6,341,035 B1 *  1/2002 Miura ................. G02B 21/0044
                                                         359/363
(Continued)

FOREIGN PATENT DOCUMENTS

JP    11-326770    11/1999
JP    2000-504858   4/2000
(Continued)

OTHER PUBLICATIONS

Japanese Notification of Reasons for Rejection, for Japanese Application No. 2016-571477, dated Aug. 8, 2017.

*Primary Examiner* — On S Mung
(74) *Attorney, Agent, or Firm* — Nixon Peabody LLP; Jeffrey L. Costellia

(57) ABSTRACT

A confocal microscope and an associated method for determining a topography of a sample by implementing a correlative spinning disk microscopy is provided. The method includes placing a sample on an object stage of the microscope. Either the object stage is moved vertically to determine the topography of the sample, while first and second images of the sample are captured in an alternating manner. A vertical focus position is stored as metadata for each image. Two first or second images are interpolated to give an intermediate image. A confocal image for a defined vertical position is generated by calculating the intermediate image with the second or first image at the position.

8 Claims, 2 Drawing Sheets

(51) Int. Cl.
  *G01B 11/24* (2006.01)
  *G02B 21/06* (2006.01)
(52) U.S. Cl.
  CPC ......... *G02B 21/0084* (2013.01); *G02B 21/06* (2013.01); *G02B 21/361* (2013.01); *G02B 21/367* (2013.01)
(58) Field of Classification Search
  USPC .......................................................... 348/79
  See application file for complete search history.

(56) References Cited

U.S. PATENT DOCUMENTS

| | | | |
|---|---|---|---|
| 6,982,824 B2 | 1/2006 | Kei et al. | |
| 2004/0257360 A1* | 12/2004 | Sieckmann | G06T 17/05 345/419 |
| 2010/0195868 A1 | 8/2010 | Lu | |
| 2014/0232844 A1* | 8/2014 | Wolff | G02B 21/006 348/79 |

FOREIGN PATENT DOCUMENTS

| | | |
|---|---|---|
| JP | 2000-258691 | 9/2000 |
| JP | 2001-083432 | 3/2001 |
| JP | 2005-70689 A | 3/2005 |
| JP | 2005-521123 A | 7/2005 |
| WO | WO-97/31282 | 8/1997 |

* cited by examiner

CONFOCAL MICROSCOPE WITH APERTURE CORRELATION

The invention relates to a confocal microscope with aperture correlation, and to a method and software for operation thereof.

A main advantage of confocal microscopy is that, by rejection of light coming from outside the focal plane, a layered image of an object to be observed is possible with improved contrast in the individual layers. This permits the reconstruction of a three-dimensional structure of the object.

Various methods of confocal microscopy are known in the prior art. The most widely used is confocal laser scanning microscopy. On account of the scanning (pixel by pixel) capture of individual points of a sample, a comparatively long time is needed in order to generate an overall image.

Scanning systems are likewise known in which several points are detected in parallel. The use of laser light means that these systems are expensive. In addition, laser light has only a narrow-band spectrum, such that spectral evaluations of image information are limited.

The software algorithm for the demodulation of the raw data of the image has to filter the modulated part of the signal and calculate several images from different mask positions in order to form an overall image.

The speed-related advantages of the imaging, which arise from the use of a confocal spinning disk, are utilized in the aperture correlation. At the same time, however, it is possible to avoid the disadvantages that arise from the use of a confocal spinning disk or, for example, a laterally scanning slit mask. In the aperture correlation, the disruptive crosstalk—light that damages the confocality since it passes through another pinhole during the detection than during the exposure—is accepted. In the aperture correlation, the crosstalk is virtually eliminated by the calculation with the non-confocal image. In a confocal spinning disk, this crosstalk would ultimately result in optical artefacts, which are also reflected in the topography that is later to be calculated.

Such a method is also described in DE 697 04 54 T2. The images of the various sections (composite and wide-field) are recorded, subtracted and presented in succession. Since the capture of composite image and wide-field image in succession takes place during a revolution of the disk, and the subtraction only thereafter, the display sequence can be at most half as great as the capture sequence. Live image display is not possible in this way.

U.S. Pat. No. 6,341,035 B1 discloses a method which is in accordance with the principle described above and with which live image display is possible. In this method, the newest captured image and the image captured immediately before the latter are always calculated. For this purpose, it is in each case determined whether the newest image is a composite image or a wide-field image, and the subtraction direction is determined accordingly. Various trigger signals control the image capture and the image processing. Markers are provided on the edge area of the disk and permit determination of the nature of the partial images. Extraction of spatial features of an object is not described in said document, since the live image display only takes place in a focal plane.

Proceeding from the prior art, the object of the invention is to develop a confocal microscope with aperture correlation in such a way as to easily allow the creation of a topography or the generation of a stacked image.

A confocal microscope according to the invention firstly comprises, in a known manner, an illumination device for illuminating a sample that can be placed on an object stage. The illumination device can, for example, be a conventional illumination of the kind known for wide-field microscopes. The object stage is preferably designed to be displaceable in the horizontal plane and vertically. Alternatively or in addition, a focus drive can be provided on an objective for the focus variation.

A spinning disk unit, which works and is constructed in a likewise known manner, is provided between the illumination device and the object stage. The spinning disk unit comprises a rotatable aperture mask with an optically open first section and with at least one structured second section for coding the illumination, as is described in DE 697 04 54 T2, for example.

The radiation reflected or emitted by the sample is decoded by means of the objective through the aperture mask or a similarly constructed decoder mask and captured by an image-capturing unit.

A first image (wide-field image) is detected by the image-capturing unit through the first section, while a second image (so-called composite image) is decoded and detected through the second section. However, in addition to the confocal parts, the composite image also contains parts of the wide-field image. Therefore, the wide-field image generally has to be subtracted from the composite image in order to obtain the confocal image.

This step and further processing steps are carried out in order to generate the confocal image in the image processor using a method according to the invention.

The invention also comprises a data processing program which has program-coding means and which can be executed in an image processor of a confocal microscope of the type in question, in order for the method steps of the method according to the invention to be implemented in an automated manner.

Advantageously, the data processing program can also be implemented in an image processor of a confocal microscope of the type in question (for example as firmware update) in order to create topographies of samples. For this purpose, it has a communications interface to a control unit of the microscope, in order to read out or control focus positions.

To generate a topography of the sample, stack images are suitable which are captured at various vertical focus positions. The various vertical focus positions can be set by vertical adjustment of the object stage and/or by focussing of the objective (focus drive). In this way, geometric structures, edges, etc., can in particular be displayed with an extended depth of focus.

This applies in particular to the display of technical surfaces, for example for determining roughness values.

According to the invention, the object stage and/or the focus drive is now driven continuously in the vertical direction during the image capture, while the first and second images are captured in a constantly alternating manner. For each image, the focus position of the object stage and/or of the focus drive, preferably detected by a position-detecting means or preset, is stored as metadata at the time of the capture.

This storage can take place for the various image types in separate or common stacks.

To calculate a confocal image at a defined focus position, three of the continuously captured images are always calculated, wherein either two first (wide-field) or two second (composite) images are interpolated to give an intermediate image and are calculated with an image of the respective other image type (second or first image) to give a confocal image, which is preferably stored together with the associated focus position as metadata in an image stack. Of course, the subtraction direction (composite image MINUS wide-field image) has to be taken into consideration here.

The topography of the sample can now be determined in a known manner from the confocal images at various focus positions. The topography arises here from the evaluation of the intensity along the stack direction. The procedure for this is described, for example, in R. Leach: "Optical Measurement of Surface Topography".

The advantages of the invention are in particular that it is possible to calculate confocal images for various focus positions in a rapid and simple way, without for this purpose having to remain in each case at one focus position, which leads to a considerable reduction in the overall measurement time, particularly in stacked imaging.

Preferred embodiments of the invention are set forth in the dependent claims.

Various alternatives can be employed in the image capture.

In a preferred embodiment of the invention, first and second images are captured in an alternating manner in a mixed stack. The number of the two image types does not have to match.

Alternatively, the first and second images are captured in separate stacks, i.e. there is a wide-field stack (first images) and a composite stack (second images). The images can in this case be stored in the same direction or the opposite direction in the stack.

For improved precision, it may be advantageous to use more than one composite stack and/or more than one wide-field stack and/or more than one mixed stack.

For the calculation of the intermediate image for the respectively desired focus position, the second images (composite) can be interpolated onto the position of the wide-field images or vice versa. It is likewise possible to interpolate first and second images onto common new positions or to combine the aforementioned possibilities. The intermediate image defined here has no relation to those intermediate images known from optical systems. It serves merely as an "intermediate station" between two or more processing steps.

At least three images are used for the calculation of the confocal image, wherein at least two images of the same type and at least one image of the other type are needed.

The intermediate image is generated by suitable interpolation of any desired type. A person skilled in the art is able to choose the interpolation suitable for this purpose. Examples mentioned here are: polynomial interpolation, spline interpolation of various degrees, nearest-neighbor interpolation, Shepard's interpolation and Akima interpolation. Extrapolations are likewise possible.

The vertical adjustment of the object stage and/or of the focus drive preferably takes place continuously, although in other embodiments of the invention it can also be varied; for example, fixed predetermined focus positions, which are stored with the image data, can be approached with or without the use of a control loop for image capturing.

The position data for the focus position can be obtained in all conceivable ways, mechanically by coded systems, optical, acoustic or magnetic or capacitive distance measurement. It is likewise possible to use color to obtain the focus position, as for example in the case of chromatic confocal microscopy (lambda scan).

The speed of the vertical advance and thus the vertical distance between the images may be identical or different for the composite images and wide-field images. Alternatively, it is possible to adapt the frame rate of the camera.

The method according to the invention can also be combined with the chromatic aperture correlation which is described in DE 10 2012 007 045 A1.

Moreover, it is possible to use a plurality of sensors for image capture in modified embodiments. The image captures do not necessarily have to be synchronous.

Preferred variants of the method according to the invention are explained in more detail below with reference to the figures. In the figures.

Sequences of various variants of the method according to the invention are shown schematically in FIGS. 1 to 4. A vertical movement of an object stage and/or focus drive is shown in each case as z axis 01. Various focus positions z1, z2 ... z7 and za are plotted on the z axis 01.

According to the invention, wide-field images 02 and composite images 03 are captured in an alternating manner at the respective focus positions z1 ... z7 by means of one or more image sensors and are stored with their respective focus position z1 ... z7 in an image stack 04. Of course, a plurality of image stacks can also be used for this storage. The focus positions can be approached in a defined manner or can be detected in a continuous stage movement.

Figure 1:
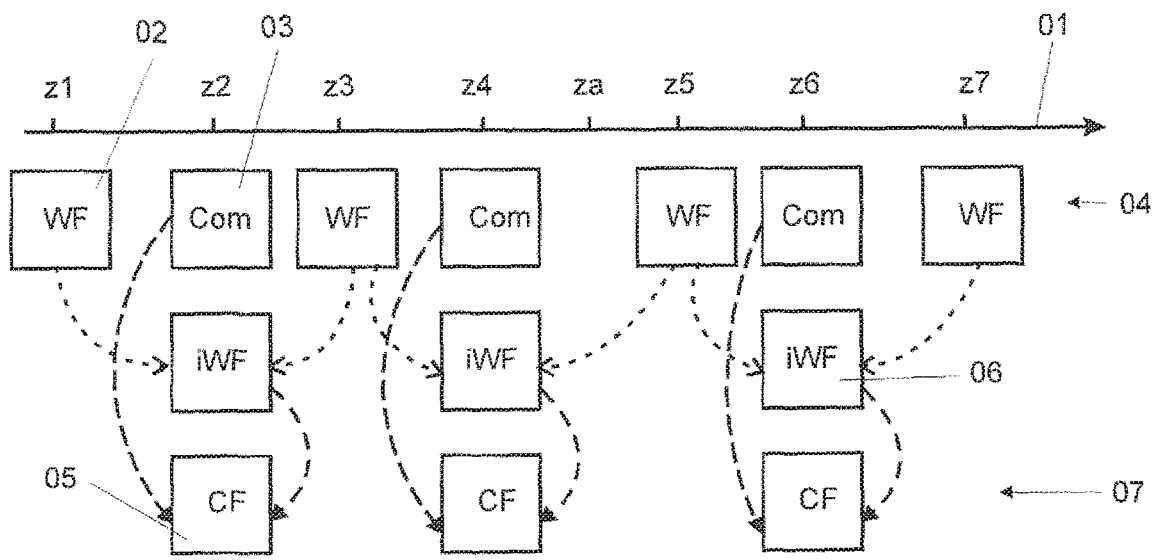
FIG. 1 shows a schematic view of a first variant of a method according to the invention, in an interpolated wide-field image as intermediate image.

In a first variant according to FIG. 1, for generating a confocal image 05 at the focus position z2 in the image processor, two wide-field images 02, which have each been detected at another Z position z1 or z3, are interpolated with known image-processing means to form a wide-field intermediate image 06 at the position z2.

The confocal image 05 of the focus position z2 is now generated in a known manner by subtraction of the wide-field intermediate image 06 from the composite image 03.

Confocal images 05 are stored with their associated focus positions z2, z4, z6 in a confocal stack image 07.

Figure 2:
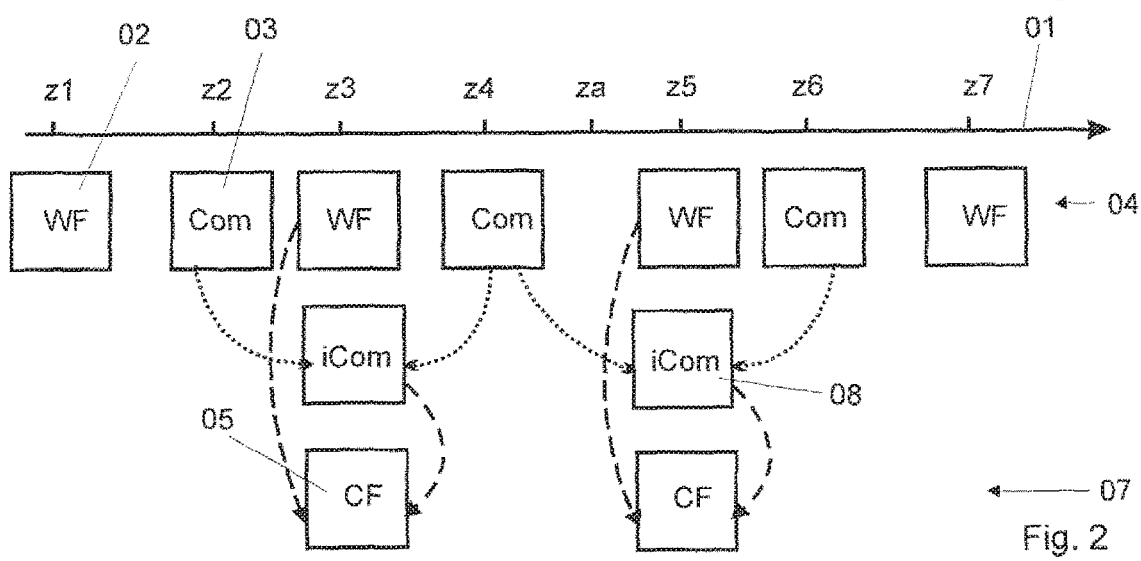
FIG. 2 shows a schematic view of a second variant of a method according to the invention, with an interpolated composite image as intermediate image.

In a second variant according to FIG. 2, as intermediate image for the focus position z3 (or z5) at which a wide-field image 02 is present in the image stack 04, two composite images 03 present at adjacent focus positions z2 and z4 (or z4 and z6) are interpolated to give a composite intermediate image 08 at the focus position z3 (or z5). The confocal images 05 are now each calculated by subtraction of the wide-field image at the focus position z3 (or z5) from the composite intermediate image 08.

Figure 3:
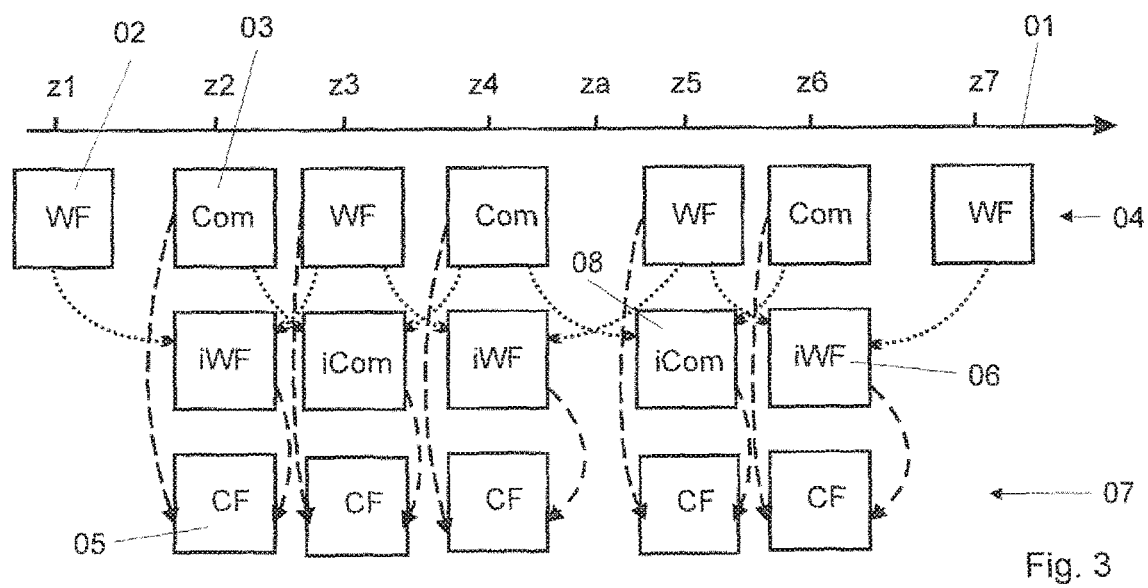
FIG. 3 shows a schematic view of a third variant of a method according to the invention, with various types of intermediate images.

The third variant according to FIG. 3 is a combination of the two described above. Each recording is used, both directly and after an interpolation, for calculation of a the confocal image 05. In this variant, a mixed intermediate image stack 09 can be temporarily stored.

Figure 4:
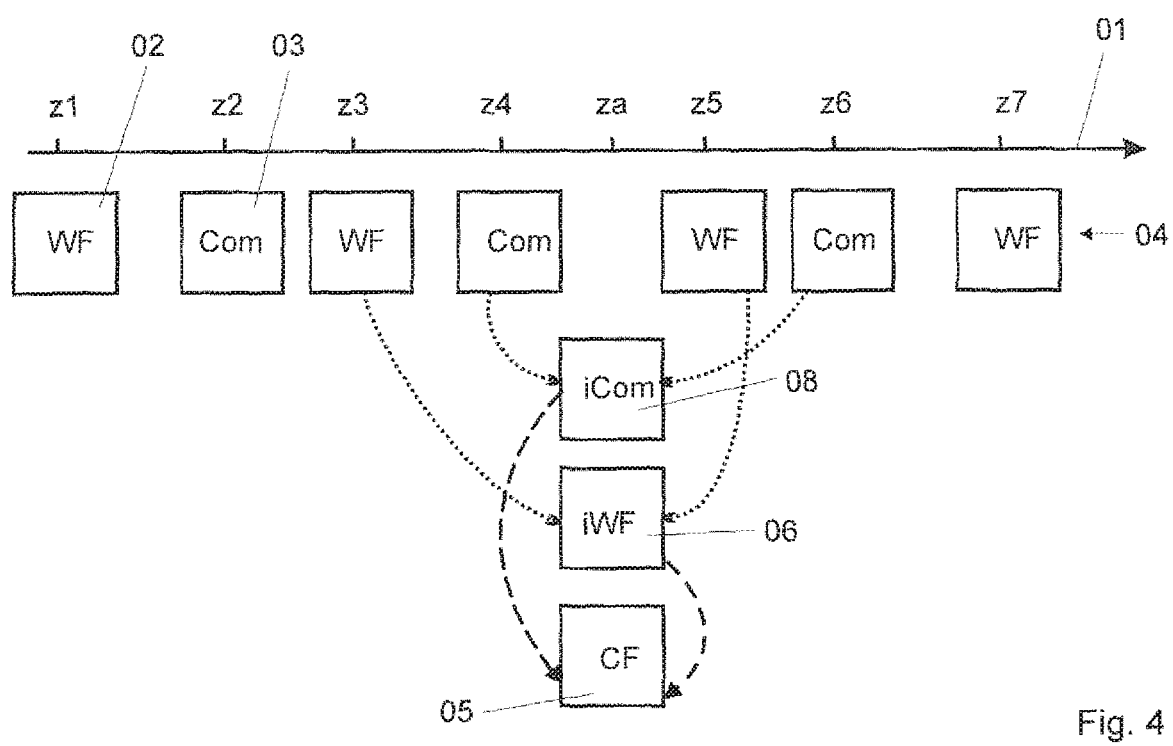
FIG. 4 shows a schematic view of a fourth variant of a method according to the invention at an arbitrary focus position.

FIG. 4 shows how a confocal image 05 can be generated for a focus position za for which there is neither an associated wide-field image 02 nor an associated composite image 03. The flexibility of the method can be enhanced by such a measure. In this fourth variant, the respectively next adjacent composite images 03 at the positions z4 and z6 are interpolated to give a composite intermediate image 08, and the adjacent wide-field images at the positions z3 and z5 are interpolated to give a wide-field intermediate image 06. The confocal image 05 is calculated by subtraction from both intermediate images 08, 06.

LIST OF REFERENCE SIGNS

01 z axis
02 wide-field image
03 composite image
04 image stack
05 confocal image
06 wide-field intermediate image
07 confocal stack image
08 composite intermediate image

The invention claimed is:

1. A method for forming at least one confocal image comprising:
   capturing a first wide-field image at a first vertical focus position, a first composite image at a second vertical focus position, and a second wide-field image at a third vertical focus position, the second vertical focus position being between the first vertical focus position and the third vertical focus position;
   forming a wide-field intermediate image for the second vertical focus position by interpolating the first wide-field image and the second wide-field image; and
   forming a first confocal image for the second vertical focus position by subtracting the wide-field intermediate image from the first composite image.

2. The method of claim 1, further comprising:
   capturing a second composite image at a fourth vertical focus position, the fourth vertical focus position being before the first vertical focus position such that the first vertical focus position is between the fourth vertical focus position and the second vertical focus position;
   forming a composite intermediate image for the first vertical focus position by interpolating the first composite image and the second composite image; and
   forming a second confocal image for the first vertical focus position by subtracting the first wide-field image from the composite intermediate image.

3. The method of claim 1, further comprising:
   capturing a second composite image at a fourth vertical focus position, the fourth vertical focus position being after the third vertical focus position such that the third vertical focus position is between the second vertical focus position and the fourth vertical position;
   forming a composite intermediate image for the third vertical focus positon by interpolating the first composite image and the second composite image; and
   forming a second confocal image for the third vertical focus positon by subtracting the second wide-field image from the composite intermediate image.

4. The method of claim 1, further comprising:
   moving an object stage vertically for the capturing of the first wide-field image, the first composite image, and the second wide-field image.

5. The method of claim 4, wherein the object stage is moved continuously vertically from the first vertical focus position, through the second vertical focus position, and to the third vertical focus position during the capturing of the first wide-field image, the first composite image, and the second wide-field image.

6. The method of claim 1, further comprising:
   moving a focus drive vertically for the capturing of the first wide-field image, the first composite image, and the second wide-field image.

7. A method for forming a confocal image comprising:
   capturing a first composite image at a first vertical focus position, a wide-field image at a second vertical focus position, and a second composite image at a third vertical focus position, with the second vertical focus position being between the first vertical focus position and the third vertical focus position;
   forming a composite intermediate image for the second vertical focus position by interpolating the first composite image and the second composite image; and
   forming the confocal image for the second vertical focus position by subtracting the wide-field image from the composite intermediate image.

8. A method for forming a confocal image comprising:
   capturing a first wide-field image and a second wide-field image at a first vertical focus position and a second vertical focus position, respectively;
   capturing a first composite image and a second composite image at a third vertical focus position and a fourth vertical focus position, respectively, the third vertical focus positon being between the first vertical focus position and the second vertical focus position;
   forming a first wide-field intermediate image for a fifth vertical focus position by interpolating the first wide-field image and the second wide-field image, the fifth vertical focus position being between the third vertical focus position and the second vertical focus position;
   forming a composite intermediate image for the fifth vertical focus positon by interpolating the first composite image and the second composite image; and
   forming a confocal image for the fifth vertical focus position by subtracting the wide-field intermediate image from the composite intermediate image.

* * * * *